(12) United States Patent
Hirata et al.

(10) Patent No.: US 7,155,498 B1
(45) Date of Patent: Dec. 26, 2006

(54) COMPUTER OPERATION MANAGEMENT SYSTEM

(75) Inventors: Toshiaki Hirata, Kashiwa (JP); Akihiro Urano, Fujisawa (JP); Shuji Fujino, Ebina (JP); Eiji Matsumura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 433 days.

(21) Appl. No.: 09/721,616

(22) Filed: Nov. 27, 2000

Related U.S. Application Data (63) Continuation of application No. 09/188,263, filed on Nov. 9, 1998, now Pat. No. 6,170,010.

(51) Int. Cl.
G06F 15/173 (2006.01)

(52) U.S. Cl. ............... 709/223; 709/224; 715/736; 718/101

(58) Field of Classification Search ........ 709/202, 709/223–224; 718/102, 104, 106
See application file for complete search history.

(56) References Cited

U.S. PATENT DOCUMENTS

| | | | |
|---|---|---|---|
| 5,414,845 A * | 5/1995 | Behm et al. ............. 718/104 |
| 5,559,955 A | 9/1996 | Dev et al. |
| 5,619,655 A | 4/1997 | Weng et al. |
| 5,642,508 A | 6/1997 | Miyazawa |
| 5,748,884 A | 5/1998 | Royce et al. ............. 714/57 |
| 5,751,914 A | 5/1998 | Coley et al. ............. 706/47 |
| 5,751,965 A * | 5/1998 | Mayo et al. ............. 709/224 |
| 5,796,951 A | 8/1998 | Hamner et al. ............. 709/223 |
| 5,826,239 A | 10/1998 | Du et al. ............. 705/8 |
| 5,872,931 A | 2/1999 | Chivaluri ............. 709/223 |
| 5,872,970 A | 2/1999 | Pickett et al. ............. 709/101 |
| 5,893,905 A | 4/1999 | Main et al. ............. 705/11 |
| 5,902,352 A * | 5/1999 | Chou et al. ............. 718/102 |
| 5,944,782 A | 8/1999 | Noble et al. ............. 709/202 |
| 6,006,193 A | 12/1999 | Gibson et al. ............. 705/8 |
| 6,023,507 A | 2/2000 | Wookey ............. 714/805 X |
| 6,098,091 A * | 8/2000 | Kisor ............. 709/202 |

(Continued)

FOREIGN PATENT DOCUMENTS

EP 0549677 9/1991

(Continued)

OTHER PUBLICATIONS

"Nikkei Computer" Jan. 22, 1996, pp. 115-117.

(Continued)

*Primary Examiner*—Patrice Winder
(74) *Attorney, Agent, or Firm*—Mattingly, STanger, Malur & Brundidge, P.C.

(57) ABSTRACT

In a computer system to which a plurality of computers are connected, a managing computer manages operations performed in the respective computers in an integrated manner, or manages the operations in relation to the computers themselves. As a result, problems occurring in the processes can be easily solved, and furthermore a load on a network is reduced. The managing computer manages a series of operations in an integrated manner in which when an operation is executed by each of the plurality of computers, or by the respective computers in combination with each other, the managing computer performs an operation designated when a specific event happens to occur on a computer. The managing computer displays each of the operations executed on the computers by a symbol; displays an execution sequence of the operations by a link with a direction among symbols; and further displays an execution condition of the computer by a color of a symbol. As a consequence, both an operation monitor screen and a computer monitor screen are mutually switched to display the switched monitor screen while setting a relationship between the computers and the operations, and the relationship between the operations and the computers are clearly represented.

13 Claims, 9 Drawing Sheets

U.S. PATENT DOCUMENTS

| | | | | |
|---|---|---|---|---|
| 6,125,390 | A | * | 9/2000 | Touboul ............... 709/223 |
| 6,289,368 | B1 | * | 9/2001 | Dentler et al. ............ 718/106 |

FOREIGN PATENT DOCUMENTS

| | | |
|---|---|---|
| GB | 2254522 | 1/1992 |
| JP | 56019160 | 7/1979 |
| JP | 62072052 | 9/1985 |
| JP | 01309146 | 3/1989 |
| JP | 04003232 | 4/1990 |
| JP | 05236575 | 2/1992 |
| JP | 07093173 | 9/1993 |
| JP | 08022403 | 7/1994 |
| JP | 08095832 | 9/1994 |
| JP | 08339284 | 5/1995 |
| JP | 09050386 | 2/1997 |
| WO | 9527249 | 10/1995 |

OTHER PUBLICATIONS

"Nikkei Open Systems" Jun. 1997, No. 51, pp. 234-239.

M. Feridun, et al, "ANM: Automated Network Management System", IEEE Network, Mar. 1988, vol. 2, No. 2, pp. 13-19.

J. Kim, et al "Process Allocation for Load Distribution in Fault-Tolerant Multicomputers", IEEE 1995, pp. 174-183.

* cited by examiner

| COMPUTER GROUP NAME | COMPUTER NAME | COMPUTER CONDITION | CPU UTILIZATION EFFICIENCY | DETAILED INFORMATION |
|---|---|---|---|---|
| GROUP A | COMPUTER A | NORMAL | 20% | |
| GROUP A | COMPUTER B | NORMAL | 50% | |
| GROUP A | COMPUTER C | ABNORMAL | 90% | |
| GROUP B | COMPUTER D | PARTIALLY ABNORMAL | 5% | |

FIG.7B

OPERATION DEFINITION TABLE 702

| OPERATION DEFINITION IDENTIFIER | COMPUTER NAME | EXECUTION CONDITION | DEFINITION SORT |
|---|---|---|---|
| 1101 | COMPUTER A | EXECUTED | POWER SUPPLY CONTROL |
| 2101 | COMPUTER A | UNDER EXECUTION | JOB NET |
| 3101 | COMPUTER A | WAIT FOR EXECUTION | PRINT |
| | | | |

FIG.7C

OPERATION DEFINITION DETAILED TABLE (POWER SUPPLY CONTROL) 703

| OPERATION DEFINITION IDENTIFIER | POWER SUPPLY INITIATION (DAY) | POWER SUPPLY INITATION (TIME) | | |
|---|---|---|---|---|
| 1101 | MONDAY TO FRIDAY | 9:00/9:00 | MONDAY TO FRIDAY | 21:00 |
| | | | | |
| | | | | |

FIG.7D

OPERATION DEFINITION DETAILED TABLE (JOB NET) 704

| OPERATION DEFINITION IDENTIFIER | JOB NET NAME | INITIATION TIME IN START | INITIATION DAY | CONFIGURATION JOB DEFINITION / STATE |
|---|---|---|---|---|
| 1101 | JOB NET A | 9:03/9:05 | MONDAY TO FRIDAY | JOB A1 / COMPLETE JOB A21/ DELAY |
| | | | | |
| | | | | |

FIG.8
EVENT/LOG TABLE 705

| EVENT/LOG IDENTIFIER | COMPUTER NAME | TIME IN START | EVENT/LOG SORT | OPERATION DEFINITION IDENTIFIER | DETAILED INFORMATION |
|---|---|---|---|---|---|
| 1001 | COMPUTER A | 6/16 9:02 | POWER SUPPLY ON | 1101 | NORMAL INITIATION |
| 2001 | COMPUTER A | 6/16 9:04 | START JOB NET A | 2101 | |
| 3001 | COMPUTER A | 6/16 9:10 | START PRINT | 3101 | PRINTER A |
| 3002 | COMPUTER A | 6/16 9:12 | END PRINT | 3101 | PRINTER A, NORMAL STATE |

FIG.9

| IMPORTANCE DEGREE 801 | DAY 802 | TIME 803 | NOTIFICATION SOURCE 804 | MESSAGE 805 |
|---|---|---|---|---|
| Normal | 97/6/19 | 9:02:20 | COMPUTER A | POWER SUPPLY IS TURNED ON |
| Normal | 97/6/19 | 9:04:50 | COMPUTER A | JOB NET A IS STARTED |
| Normal | 97/6/19 | 9:10:30 | COMPUTER A | PRINT BY PRINTER A IS STARTED |
| Error | 97/6/19 | 9:13:30 | COMPUTER A | FAILURE OCCURS DURING PRINTING OPERATION BY PRINTER A |

FIG.10

EVENT / LOG TABLE ~801

| EVENT/LOG IDENTIFIER | COMPUTER NAME | TIME IN START | EVENT/LOG SORT | CHECK POINT INFORMATION | OPERATION DEFINITION IDENTIFIER | DETAILED INFORMATION |
|---|---|---|---|---|---|---|
| 1001 | COMPUTER A | 6/16 9:02 | POWER SUPPLY ON | — | 1101 | NORMAL INITIATION |
| 2001 | COMPUTER A | 6/16 9:04 | START JOB NET A | — | 2101 | NORMAL INITIATION |
| 2003 | COMPUTER A | 6/16 9:04 | START JOB A-1 | — | 2101 | NORMAL INITIATION |
| 3001 | COMPUTER A | 6/16 9:10 | START PRINTING | — | 3101 | PRINTER A |
| 3002 | COMPUTER A | 6/16 9:12 | END PRINTING | — | 3101 | PRINTER A, NORMAL STATE |
| 2004 | COMPUTER A | 6/16 9:13 | END JOB A-1 | OK | 2101 | NORMAL END |
| 2003 | COMPUTER A | 6/16 9:14 | START JOB A-2 | — | 2101 | NORMAL INITIATION |
| 2004 | COMPUTER A | 6/16 9:13 | END JOB A-2 | OK | 2101 | NORMAL END |
| 2002 | COMPUTER A | 6/16 9:13 | END JOB NET A | — | 3101 | PRINTER A, NORMAL STATE |

COMPUTER OPERATION MANAGEMENT SYSTEM

This is a continuation of application Ser. No. 09/188,263, filed Nov. 9, 1998 now U.S. Pat. No. 6,170,010.

BACKGROUND OF THE INVENTION

The present invention relates to a computer operation management system in which a plurality of computers are connected via a network to a managing computer for managing these computers.

Japanese periodicals "NIKKEI COMPUTER" (issued on Jan. 22, 1996, in pages 115 to 117), and "NIKKEI OPEN SYSTEM" (issued in June, 1997, No. 51, pages 234 to 239) describe the following conventional computer systems. That is, in these conventional computer systems, the functions for executing the operation processes are provided as independent programs. As the operation processes, there are the controls of turning ON/OFF the power supply, the job execution control, the print control, and the like. Also, these Japanese periodicals describe that the function for managing the conditions of the computers and the communication network is provided as a program independent from a product for controlling/monitoring the executions of the above-described operations.

U.S. Pat. No. 5,619,655 entitled "System for administration and management of network from remote or central station through an operator interface which prepare and stores the management orders for execution" and U.S. Pat. No. 5,642,508 entitled "Distributed control method and apparatus for job execution" disclose approaches for performing network management and job execution management as independent operations at remote management stations.

As a result, in these computer systems, with respect to each of the respective computers, or each of the operation processes executed in the respective computers, a display monitor screen used to confirm the definition of the execution schedule for this operation process, and also the display screen used to confirm the execution result of each of the operation processes are constituted. Furthermore, the screen used to confirm the conditions of the computers and the communication network is arranged as a separate screen from the above-described management screens for the operation processes.

The above-mentioned conventional computer systems are suitable only for such a case that only necessary operation functions are utilized in relatively small-scaled networks. However, if the above-mentioned conventional computer systems are applied to such a lange-scale computer system, then a total operation management could not be practically realized as a computer system. That is, in this large-scale computer system, there are many possibilities that a plurality of operation processes are combined with each other when these operation processes are executed. This is because the computers and the communication networks should be furthermore and in an integrated manner managed with respect to each of the operation processes.

In addition, since the respective operation processes are independently operated and both the computers and the communication network are separately managed, it is practically difficult to solve the problem occurring in the operation processes in correspondence with the problem occurring in the computers.

However, when all of the operation management processes are carried out by the managing computer, since communications are required between the managing computer and each of the computers, network traffics must be considered.

SUMMARY OF THE INVENTION

An object of the present invention is to provide a method and a program, and furthermore, a computer or a system using the same in a computer system to which a plurality of computers are connected, in which a managing computer for managing these computers manages operations executed by the respective computers in a batch mode, and the managing computer can execute operating of the operations and managing of the computers themselves in relation to each other, and a problem occurring in the operations process can be readily solved in relation to a problem occurred in the computers themselves and in a communication network.

Another object of the present invention is to provide a method and a program capable of avoiding an excessive load on the communication network, and to provide a computer, or a system with employment of this method and program.

To achieve the above-mentioned objects, according to a first aspect of the present invention, in a computer operation management system where a plurality of computers are connected via a network to a managing computer, the managing computer comprises:

means for managing a series of operations collectively or integrally, the series of operations executing operations designated in such a case that a power supply of the respective computers, or of a computer for executing a job in combination with the respective computers is turned ON and turned OFF, a job is executed, an execution result is printed, and a specific event happens to occur;

operation monitoring means for representing the respective operations executed on the computers by symbols, for representing an execution order of the respective operations by links with directions among the symbols, and further for representing execution conditions of the respective operations by colors of the symbols;

computer monitoring means for representing a connection relationship among the computers by links among symbols, and furthermore for representing operation conditions of the computers by colors of symbols;

means for mutually switching a monitor screen displayed by the operation monitoring means and a monitor screen displayed by the computer monitoring means to display the switched monitor screen, while making a relationship between the computers and the operations executed on the computers, and also for clarifying the relationship among the operations and the computers;

means for displaying the computer symbols of the computer monitoring means in a plurality of colors in response to conditions of the computers; and means for displaying the operation symbols of the operation monitoring means in a plurality of colors in response to conditions of the operations.

Also, according to a second aspect of the present invention, in a computer operation management system where a plurality of computers are connected via a network to a managing computer, the managing computer comprises:

means for displaying thereon a message in which a change in the operation and the condition of the computer is notified as an event on the managing computer;

means for changing a display color of the message in accordance with an importance degree of the event;

means for instructing a previously designated computer to execute an action of a previously designated operation when a specific event is received;

means for referring to conditions of the respective computers managed by the computer monitoring means in the case that an operation cannot be accomplished under normal condition due to a cause of computers, or an operation program, and for instructing the computers operated under normal condition to retry the operations by returning back to a time instant when the operation can be retried;

means for regularly acquiring load conditions of the respective computers whose operations should be executed;

means for monitoring a time instant of an execution result with respect to a scheduled execution time instant of an operation; and means for interrupting the execution of operation on the computer at an execution point of a switchable operation when the execution result time instant exceeds a predesignated time range, and for instructing another computer whose load is lower than, or equal to a predetermined load to execute an operation from a next execution point.

DESCRIPTION OF THE EMBODIMENTS

Referring now to drawings, various embodiments of the present invention will be described.

Figure 2:
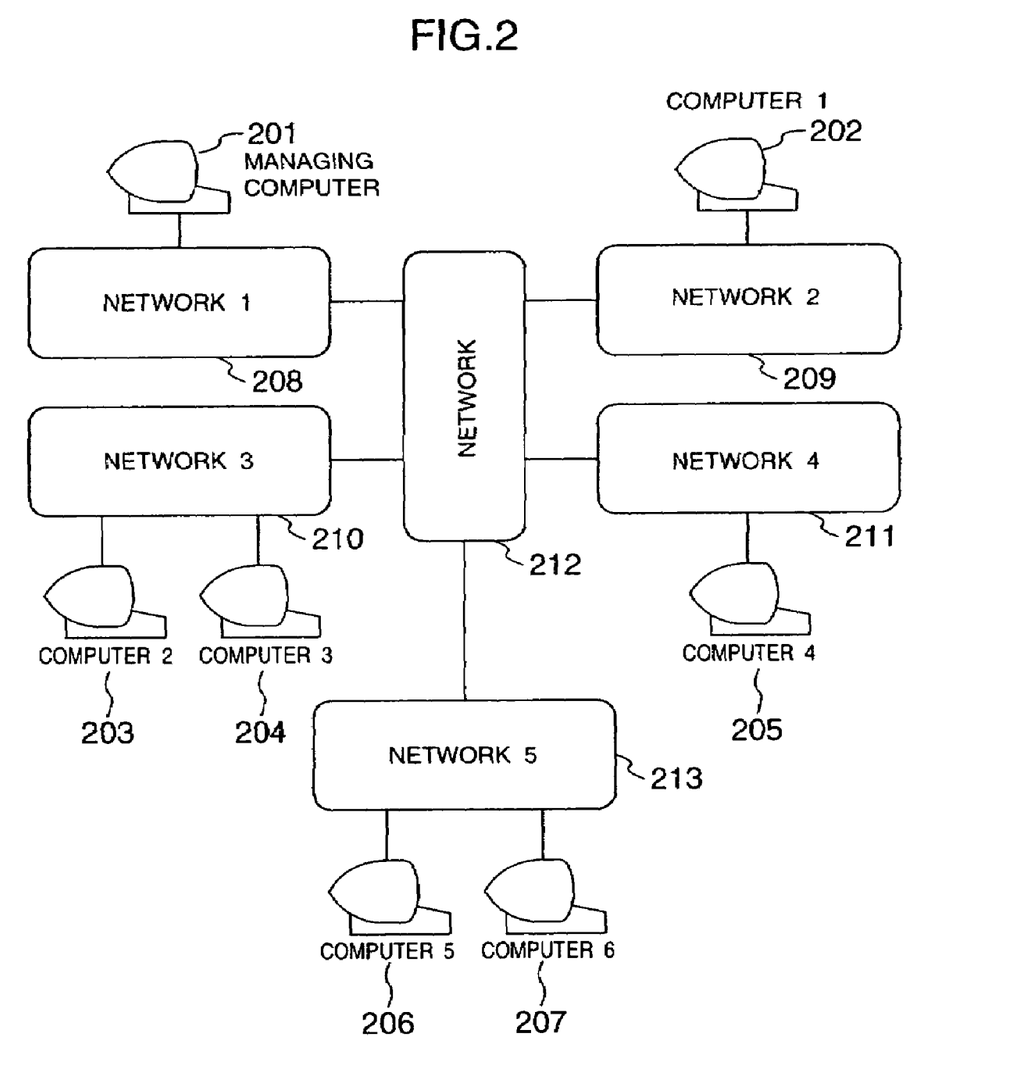
FIG. 2 schematically represents an entire structural diagram of a computer system according to an embodiment of the present invention.

In FIG. 2, there is shown an overall arrangement of a computer system according to this embodiment. A managing computer 201 is connected via networks 208 to 213 to computers 202 to 207 which are to be managed by the managing computer.

The computer system according to this embodiment allows the managing computer to collectively manage operation definition information, execution conditions, and execution results in combination with conditions of the computers themselves and the networks. In the operation definition information, execution schedules of operation processes are defined which should be executed by the computers 202 to 207. The execution conditions and the execution results are related to the computers 202 to 207.

Figure 1:
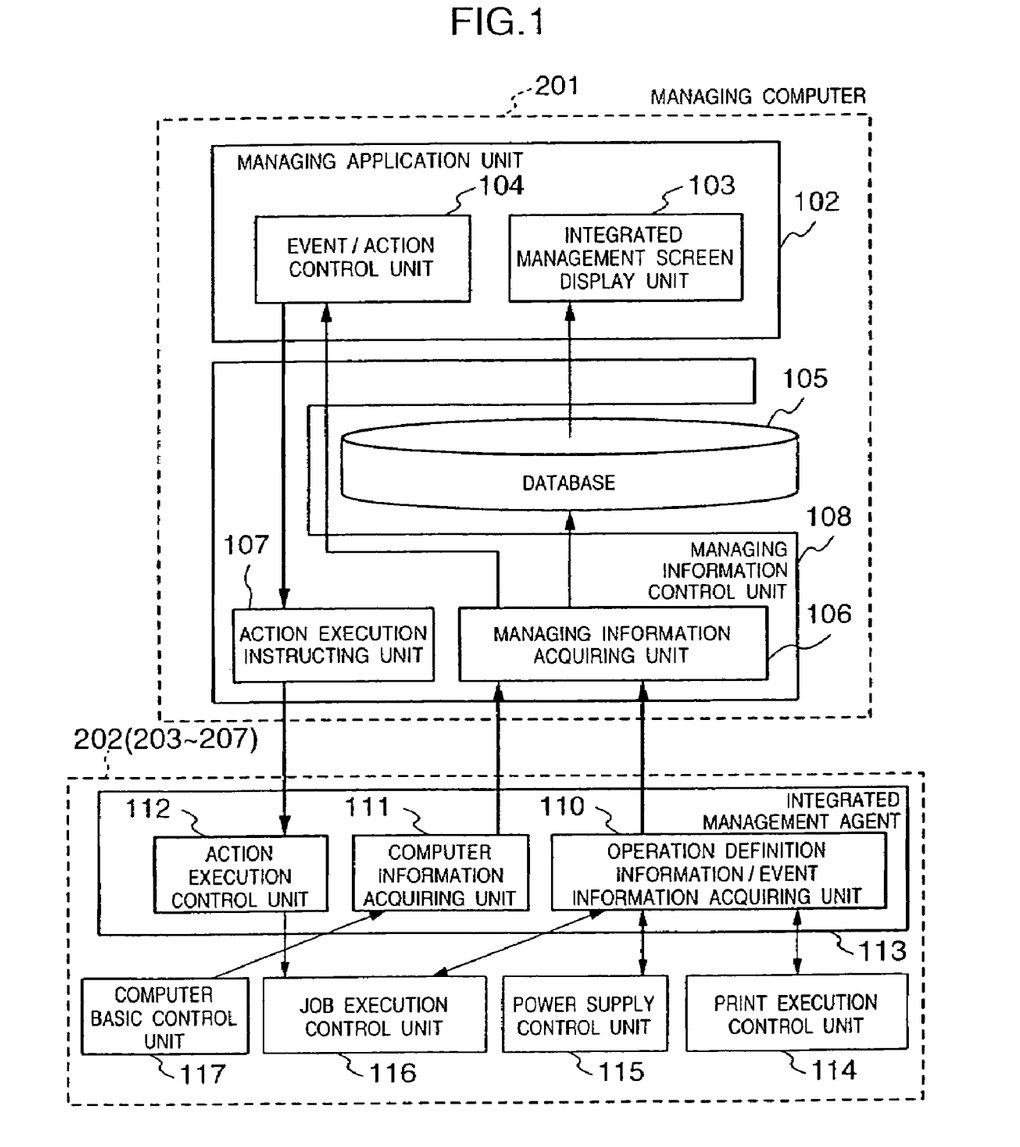
FIG. 1 is an explanatory diagram for explaining a system structure used to manage administration operations executed in the respective computers in an integrated manner by a managing computer.

FIG. 1 represents a system structure used to realize an integrated management of the computers 202 to 207 by the managing computer. It should be noted that although FIG. 1 indicates only the managing computer 201 and one computer 202, each of other computers 203 to 207 is similar to this computer 202.

As indicated in FIG. 1, the managing computer 201 includes a managing application unit 102, a database 105, and an managing information control unit 108.

The managing application unit 102 contains an integrated management screen display unit 103 and an event/action control unit 104. The integrated management screen display unit 103 displays and manages operation execution schedules, execution conditions, and events of the computers 202 to 207. The event/action control unit 104 executes a pre-designated process with respect to a specific event received from the computer. The managing information control unit 108 contains a managing information acquiring unit 106 and an action execution instructing unit 107. The managing information acquiring unit 106 acquires the operation definition information and the event information from the computers 202 to 207. The action execution instruction unit 107 instructs a specific action with respect to the computers 202 to 207. The managing information acquiring unit 106 notifies the management information acquired from the computers 202–207 to the integrated management screen display unit 103, and further, if necessary, stores the management information into the database 105.

Also, each of the computers 202 to 207 is constituted by an operation execution portion and an integrated management agent 113. The operation execution portion executes an operation process defined by operation definition information about a computer basic control unit 117, a job execution control unit 116, a power supply control unit 115, a print execution control unit 114, and so on. The computer basic control unit 117 executes a basic control such as hardware and a process of a computer shown in FIG. 3.

The integrated management agent 113 is constructed of an operation definition information/event information acquiring unit 110, a computer information acquiring unit 111, and an action execution control unit 112. The operation definition information/event information acquiring unit 110 acquires present operation definition information and present event information from each of the operation execution portions. The computer information acquiring unit 111 acquires information relating to a utilization condition of hardware resources such as a CPU and a memory, and also to a utilization condition of software resources from the computer basic control unit 117. The action execution control unit 112 instructs an action execution received from the managing computer to the operation execution portions.

Figure 3:
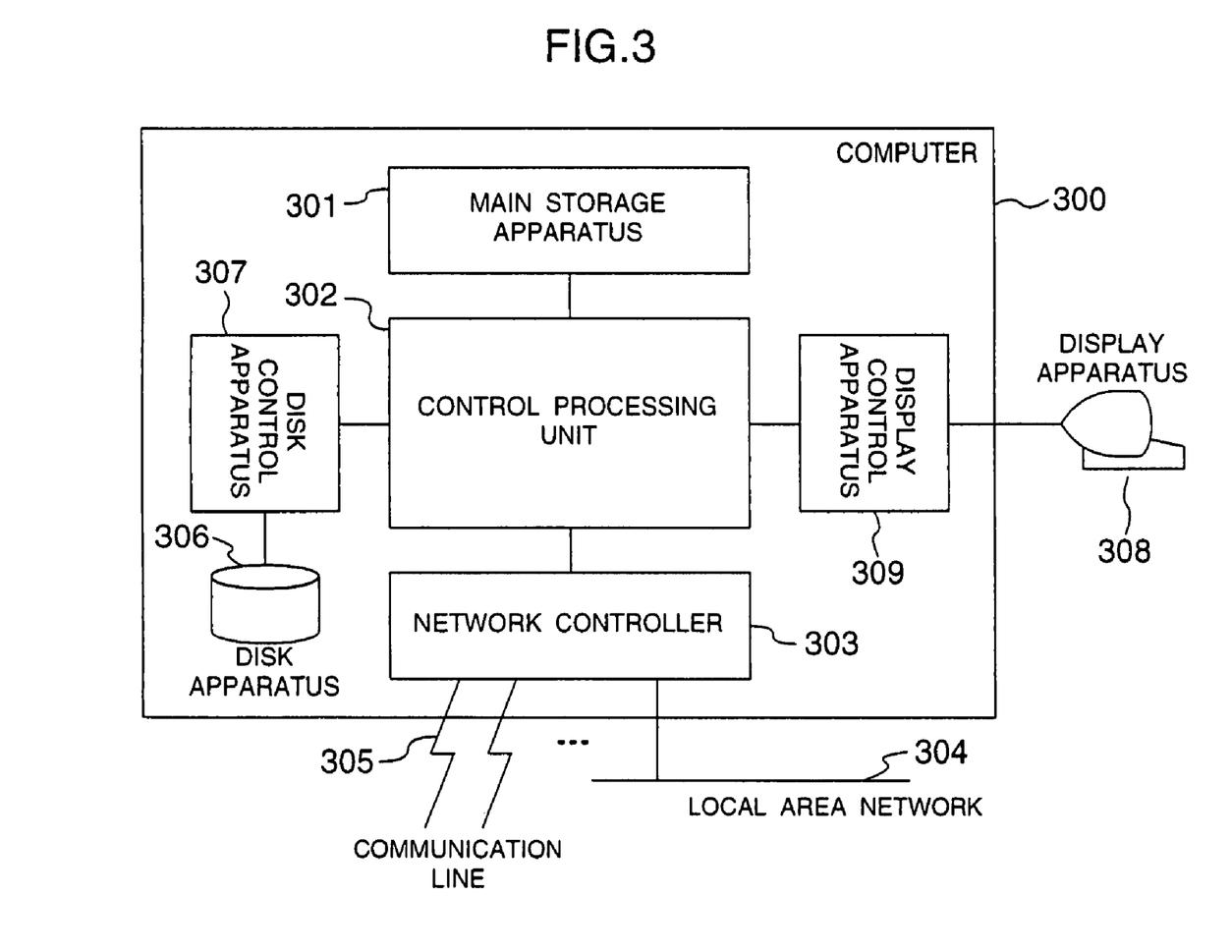
FIG. 3 schematically shows a hardware structural diagram of a managing computer and a computer.

In FIG. 3, there are shown a hardware structure of the managing computer 201 and a hardware structure of the computers 202 to 207.

As indicated in FIG. 3, each of the computers includes a central processing unit 302; a main storage apparatus 301; a network control apparatus 303 for controlling input/output of data between the own network control apparatus and a network such as a communication line 305 and a local area network 304; a disk apparatus 306; a disk control apparatus 307 for controlling input/output of the disk apparatus 306; a display apparatus 308; and a display control apparatus 309 for controlling input/output of the display apparatus 308.

Among the structural blocks of FIG. 1, the database 105 is realized on the disk apparatus 307, whereas other structural blocks are realized by such a way that the central processing unit 302 loads a program stored on the disk apparatus 307 and then executes this program. It should be noted that this program is recorded on, for example, a recording medium such as a CD-ROM a floppy disk and a MO, is read by a driver (not shown), and is stored in the disk apparatus 307.

A description will now be made of a method for acquiring the managing information in the system arrangement of FIG. 1 as follows:

As to the operation definition information defined in the computer, and the event information for notifying that the operation is commenced and ended, and the failure happens to occur, such a method is conceivable to acquire these information at regular timing from the managing computer, or at timing when these information is required so as to display the managing information on the screen. Otherwise, another method is conceivable to initiatively notify these information by the computer to the managing computer at proper timing. Upon receipt of these information, the managing computer stores these information into the database, and displays such information having a high real-time characteristic on the integrated management screen display unit in accordance with a method (will be discussed later) shown in FIG. 4.

On the other hand, as to the structural information of the computer itself, the following methods are conceivable. That is, while computers to be managed are defined in the managing computer, detailed information is acquired via a computer information acquiring unit 111 from these computers. While an integrated managing agent is previously installed into the computers, the computer into which this program has been installed is searched by a method of a broadcast, and then detailed information is acquired via the computer information acquiring unit 111 from these computers.

Next, an example of an integrated management screen will now be explained with reference to FIG. 4, which is displayed by the integrated management screen display unit 103 owned by the managing application unit 102 in the managing computer 201.

As previously explained, in the managing computer 201, since the operation definition information, the event information, and the log information are stored into the database 105, the operation manager and the like utilize these information, so that the operation conditions of the computer system can be grasped. In other words, in the managing computer 101, such information which is requested to be referred to by the operation manager and the like is retrieved/referred to by the managing information control unit 108, and the integrated management screen display unit 103 owned by the managing application unit 102 produces an integrated management screen by using the retrieved/referred information. Then, the integrated management screen display unit 103 causes the display apparatus 308 to display thereon the produced integrated management screen. As a consequence, the operation manager and the like can grasp the operation conditions of the computer system by observing the integrated management screen displayed on the display apparatus 308.

Figure 4:
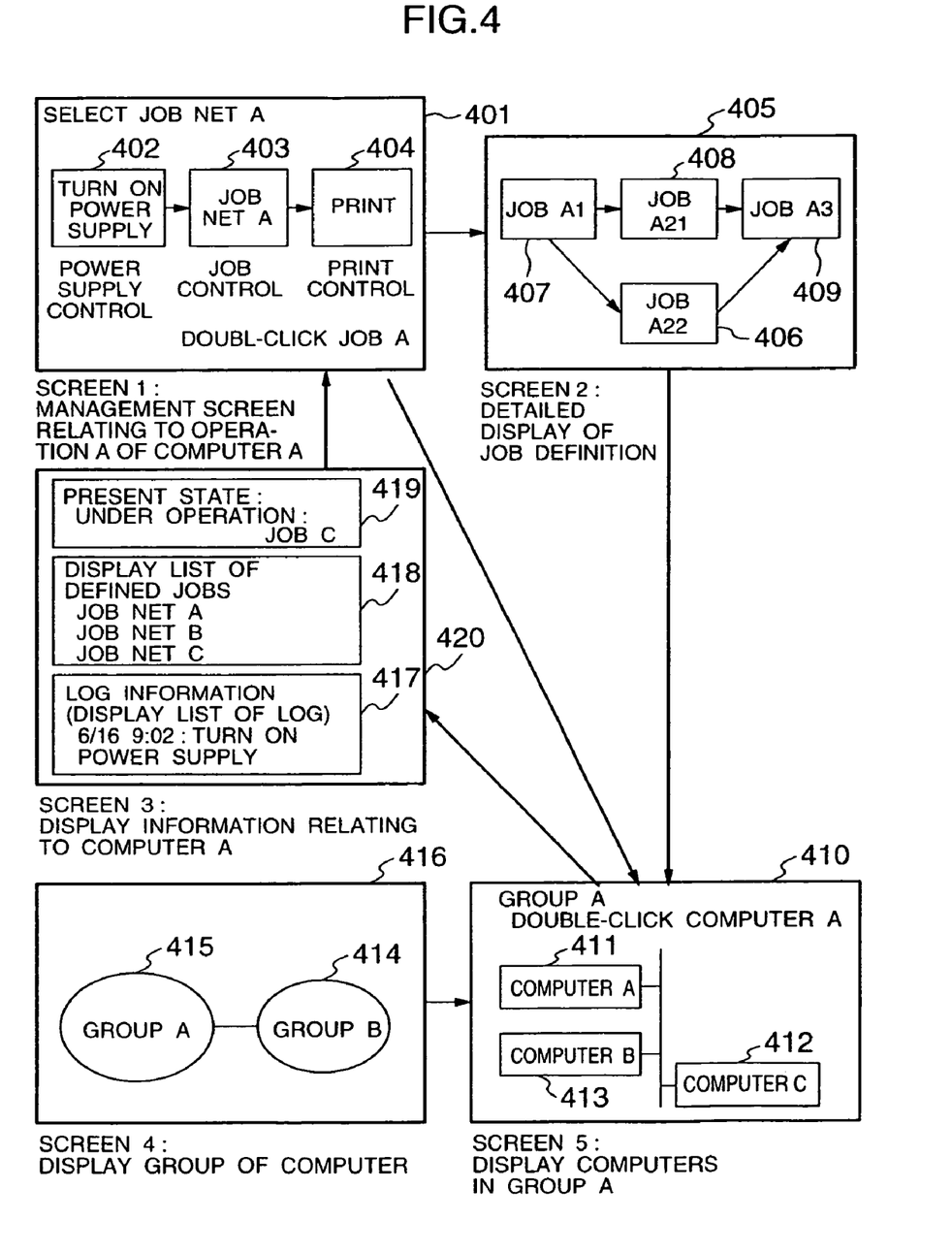
FIG. 4 is an explanatory diagram for explaining an example of an integrated management screen displayed in the managing computer.

In FIG. 4, a screen 1(401) is an integrated management screen relating to "operation A" on "computer A". This screen 1 represents operation definition information which defines a series of operation processes such as "turn-ON of power supply (402)", "execution of job net A (403)", and "print of execution result "511")" as to "computer A". It should be noted that these operation processes 401 to 404 are indicated as icons, and various conditions such as "not yet executed" "under execution", "normal end of execution", or "abnormal end of execution" may be represented by changing the display modes (for example, change in color) of the respective icons. When the display modes of the respective icons are changed, the integrated management screen display unit 103 acquires latest event information at the timing of the corresponding operation processes 401 to 404 by the managing information acquiring unit 106.

For example, since the operation manager and the like double-clicks "job net A (403)" by way of a mouse in the screen 1(401), the screen 1(401) can be transient to another screen 2(405).

In FIG. 4, a screen 2(405) corresponds to a detailed integrated management screen concerning "job net A" on "computer A". In this screen 2(405), the following definition is made that after an execution of "job A1(407)" has been accomplished as to "job net A", both "job A21(408)" and "job A22(406)" are executed in a parallel manner, and at the time when the executions of both jobs are complete, "job A3(409)" is executed. It should also be noted that these operation processes 406 to 409 are represented as icons, and various conditions such as "not yet executed" "under execution", "normal end of execution", or "abnormal end of execution" may be represented by changing the display modes (for example, change in color) of the respective icons. When the display modes of the respective icons are changed, the integrated management screen display unit 103 preferably acquires latest event information at the timing of the corresponding operation processes 406 to 409 by the managing information acquiring unit 106.

In FIG. 4, a screen 4(416) corresponds to an integrated management screen used to confirm a group of the computers managed by the managing computer. In this case, both "group A(415)" and "group B(414)" are represented on this screen 4(416). The respective groups are displayed as icons. The operation manager or the like double-clicks "group A" on the screen 4(416) by using the mouse, so that this screen 4(416) may be transient to a screen 5(410).

In FIG. 4, a screen 5(410) corresponds to an integrated management screen used to confirm the computers belonging to the group A on the screen 4. In this case, three sets of computers 411 to 413 are represented. These computers are represented as icons. Since the display modes of the respective icons are changed (for example, change in colors), various conditions such as "under initiation", "stop", or "partially stop" can be displayed. When the display modes of the respective icons are changed, the integrated management screen display unit 103 acquires latest event information at the timing of the corresponding computers 411 to 413 by the managing information acquiring unit 106. For instance, in the image 5, since the icon of "computer A(411)" is double-clicked by using the mouse, this screen 5 may be transient to the screen 3(420).

In FIG. 4, a screen 3(420) corresponds to an integrated management screen used to confirm an operation condition of "computer A". As to "computer A", an execution condition (419) of a present job, a list (418) of job nets whose executions are defined on "computer A", and a list (417) of log information equal to a past operation history are represented in the form of messages on this screen 3(420). For example, since the operation manager and the like double-clicks a line related to "job net A" on the screen 3, the screen 3(420) may be transient to the screen 1(401).

Also, in either the screen 1(401) or the screen 2(405), since the operation manager and the like selects menu titled "computer structure display" (not shown), the screen 1(401) may be transient to the screen 5(410). At this time, on the display of the screen 5, the display method of "computer A" may be replaced by an enhancement display method in order to clarify a different from another computer.

FIG. 7A to FIG. 7D, and FIG. 8 indicate a method for managing on the database, configuration information of computers, operation definition information, information indicative of these conditions, and event information.

Figure 7A:
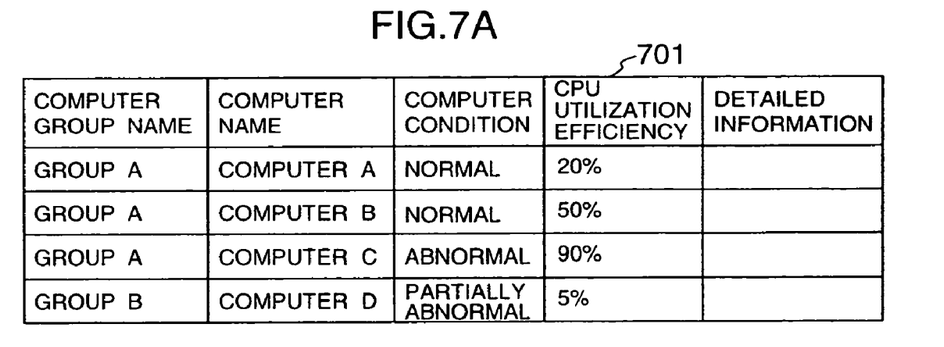
FIG. 7A shows a computer management table, FIG. 7B indicates an operation definition table.
Figure 7B:
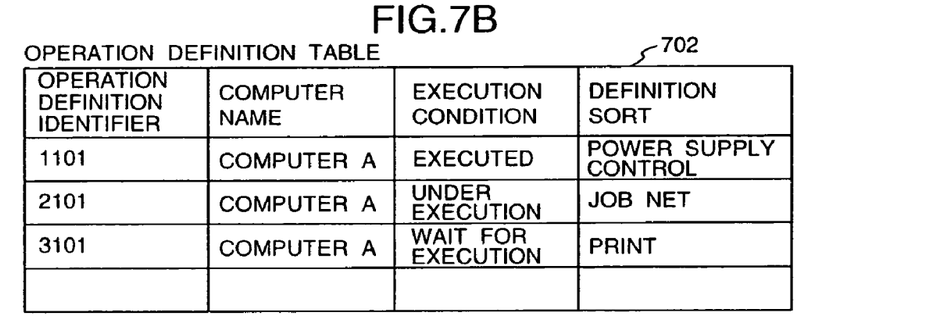
Figure 7C:
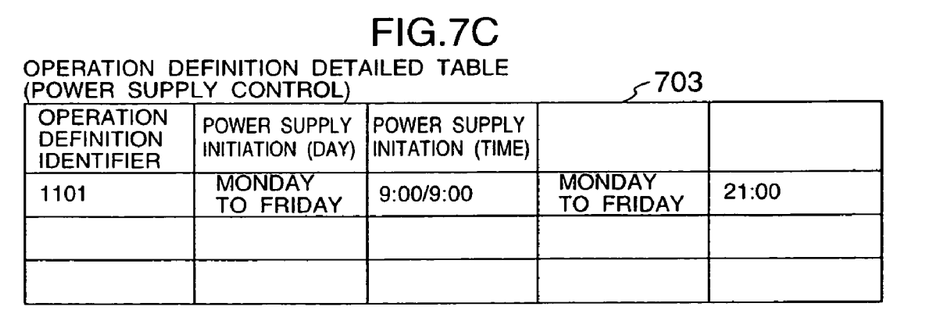
FIGS. 7C and 7D represent operation definition detail tables, respectively.
Figure 7D:
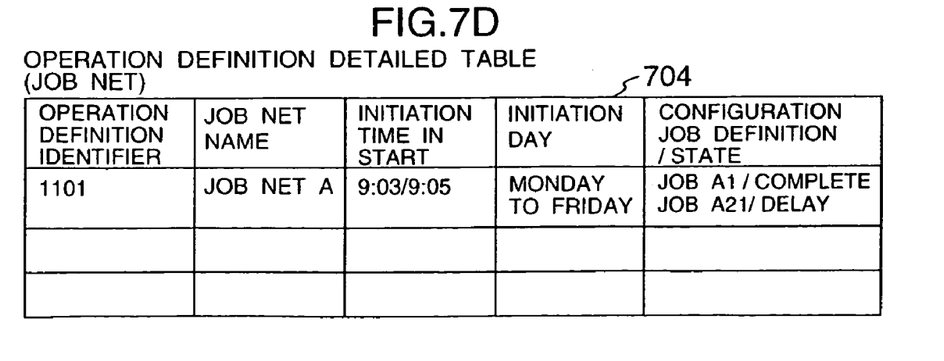
Figure 8:
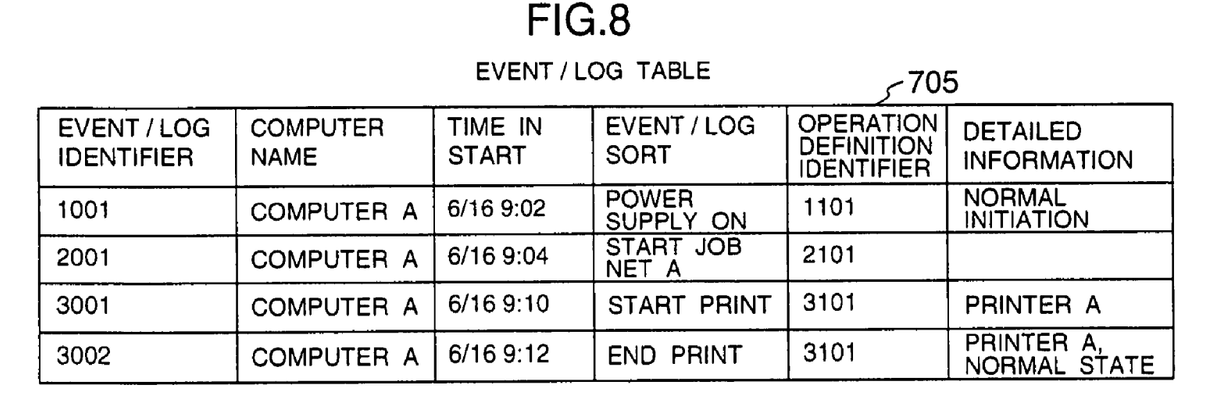
FIG. 8 is an explanatory diagram for explaining an example of structures of various tables contained on a database.

A computer management table 701 indicated in FIG. 7A stores thereinto managing information with respect to each of the computers in the order of definitions of the computers by the user (in the case that computers are manually defined), or in the order of discovery by the managing computer (in the case that computers are automatically discovered by managing computer). A single record is constituted by "computer group name", "computer name", "operation condition", "CPU utilization efficiency", and "detailed information". Among the above-described information, "operation condition" and "CPU utilization efficiency" are ones which are dynamically changed. It is possible to implement a method for acquiring these information at the time when the information is displayed on the integrated management screen display unit 103 in addition to the method for regularly acquiring these information by the managing computer. The acquisition may be realized in such a manner that the action execution control unit 112 of the integrated management agent 113 receives the information from the computer basic control unit 117. An operation definition table 702 corresponds to a table with respect to each of operation sorts other than a common table constituted by "identifier", "computer name", and "operation sort", and refers to operation definition detailed tables shown in FIG. 7C and FIG. 7D. In a table 703 relating to a power supply control shown in FIG. 7C, an operation definition detailed table is arranged by, for instance, "identifier", "power supply initiation (day)", "power supply initiation (time)", "power supply interrupt (day)", and "power supply interrupt (time)". In a table 704 relating to a job net indicated in FIG. 7D, an operation definition detailed table is arranged by, for example, "identifier", "job net name", "initiation day", "initiation time", and "configuration job definition". These operation definition information is acquired from the corresponding operation processes 114 to 116 via the operation definition information/event information acquiring unit 110 in the computer e.g. 202. The acquired information is converted into the table format of the above-described database 105 in the managing information acquiring unit 106 in the managing computer 201, and then the converted information is stored into the database 105. An event/log table 705 indicated in FIG. 8 is used to store thereinto the events and the log information acquired from the computer 202 by the managing computer 102 in a time sequence. A single record is arranged by "identifier", "computer name", "time", "event/log sort", and "detailed information". These record structures except for "detailed information" are made as a common format for all of the event logs. The above-described conversion into the format can be executed in the managing information acquiring unit 106 by the managing computer 201.

In the managing computer 201, the managing information control unit 108 retrieves the tables 701 to 705 shown in FIG. 7A to FIG. 7D, and FIG. 8 by using, for instance, a language of SQL and so on, so that the integrated management screen display unit 103 owned by the managing application unit 102 displays the monitor screen as shown in FIG. 4. In particular, as to a relationship between the operation definition information and the computer structural information, while this computer management table 701 is referred to from the computer name of the operation definition table 702 on the management screen 401, the configuration of the computers of the group to which this computer belongs can be displayed.

Also, on the management screen 410 of the computer, when the computer name is designated, while referring to the computer names of the operation definition table 702 and of the event/log table 705, the operation definitions and the execution conditions in this computer can be displayed (420, 401). When the screen is displayed, the managing computer 101 acquires the information required to be displayed at such a time instant when this information required to be displayed is not contained in the tables 701 to 705 shown in FIG. 7 and FIG. 8.

On the other hand, as to the event information, the managing computer 201 displays this event information on the monitor screen 308 immediately after the event information has been notified. A screen displayed by the managing computer 201 at this time is illustrated in, for example, FIG. 9.

Figure 9:
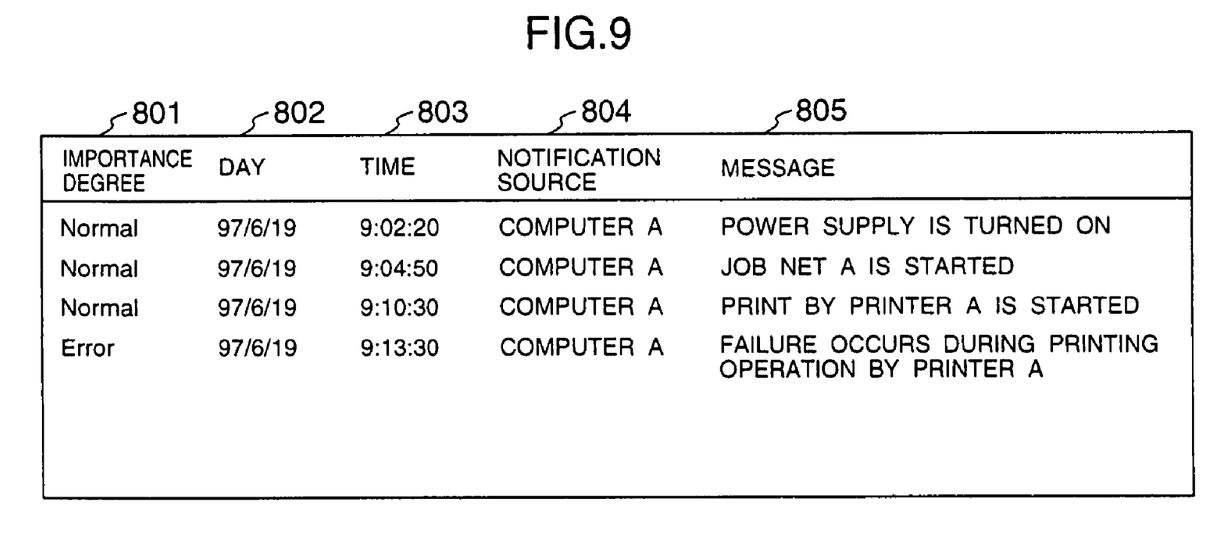
FIG. 9 is an explanatory diagram for indicating an example of event information displayed by the managing computer.

FIG. 9 represents an example of a monitor screen on which event information of a computer A is displayed as a message among the notified event information. In this Figure, the message is constructed of an importance degree 801 of the event information, day/time 802 to 803 when the event is notified, a computer 804 of a notification source, and a message description 805. Furthermore, the message may be displayed in different colors, depending upon the importance degree.

As indicated in FIG. 9, the notified event information is outputted in a time series on the message display screen as shown in FIG. 9, but also is reflected on the display colors relevant to the management screen 401 and the computer management-screen 410 in FIG. 4.

As will be discussed later, in addition, when a specific event occurs, a predesignated operation may be instructed to a computer to be managed. A specific explanation thereof will now be made with reference to FIG. 5 and FIG. 6.

Figure 5:
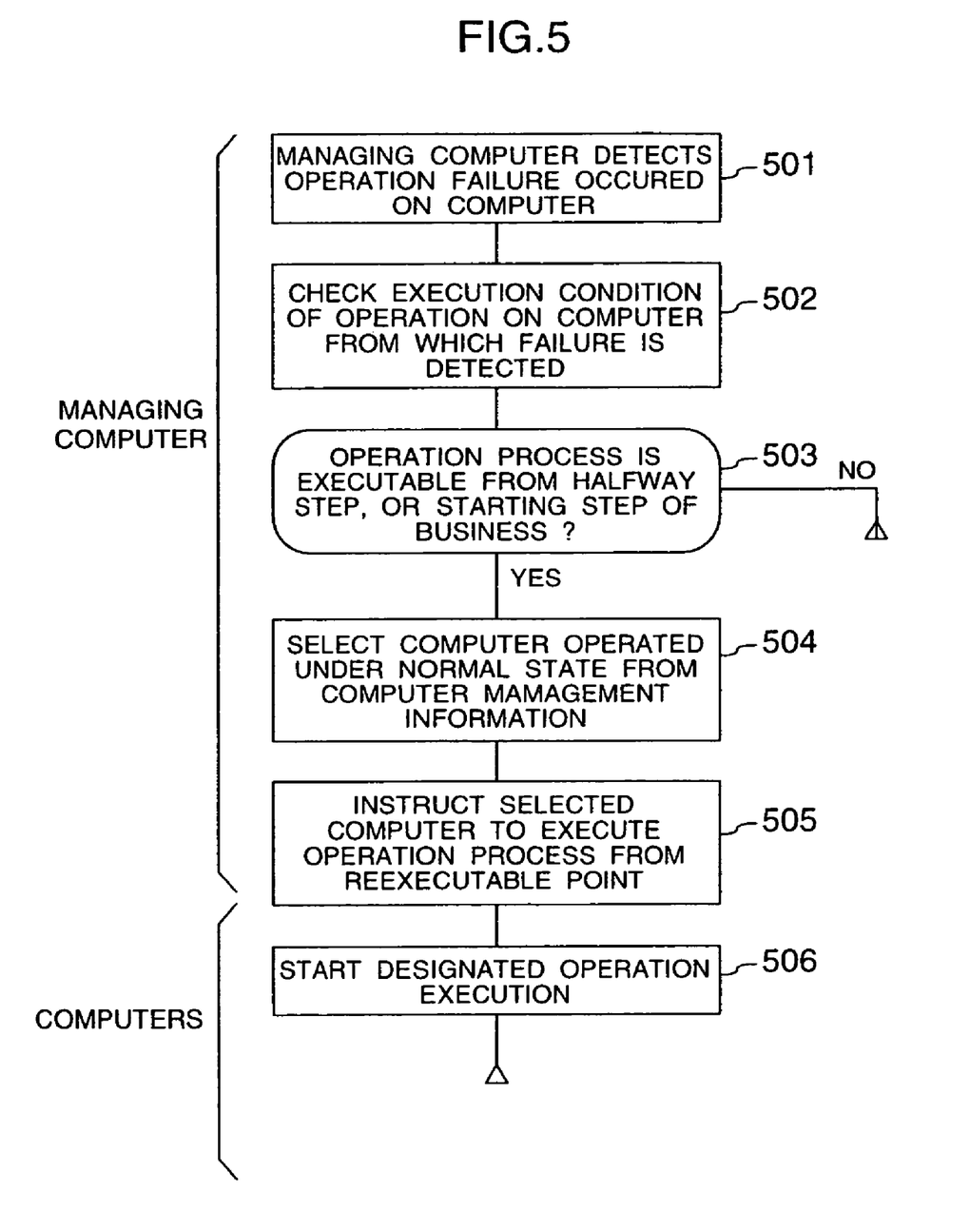
FIG. 5 is an explanatory diagram for representing a recovery sequence when a failure happens to occur in the computer.

Referring now to FIG. 5, a retry process operation executed when an abnormal operation is detected will be described.

In FIG. 5, when the managing computer 201 detects an abnormal operation process in the computer 202 based upon the table 704(501), this managing computer 201 investigates operation execution conditions of the computer, the abnormal operation process of which is detected (502). This investigation is to judge as to whether or not a retry can be automatically executed. Furthermore, if the retry can be carried out, then the managing computer 201 judges a time instant when a certain operation process should be retried among a series of operation processes (503). A judgement whether or not this operation process can be automatically retried may be done as follows. That is, if a certain operation process among a series of operation processes is traced back, then the operation process can be automatically retried when the operation processes up to this traced time instant have been completed, and furthermore, no adverse influence is given to the subsequent operation processes only by utilizing the preceding results (in this case, the result is recorded on the non-volatile recording medium such as the disk apparatus 306; the above-described result information is transferred to another computer different from this computer; and the transferred information is required to be read during retry operation). Apparently, there is no problem when the operation processes have been accomplished up to this time instant, and furthermore the preceding results need not be used.

Figure 10:
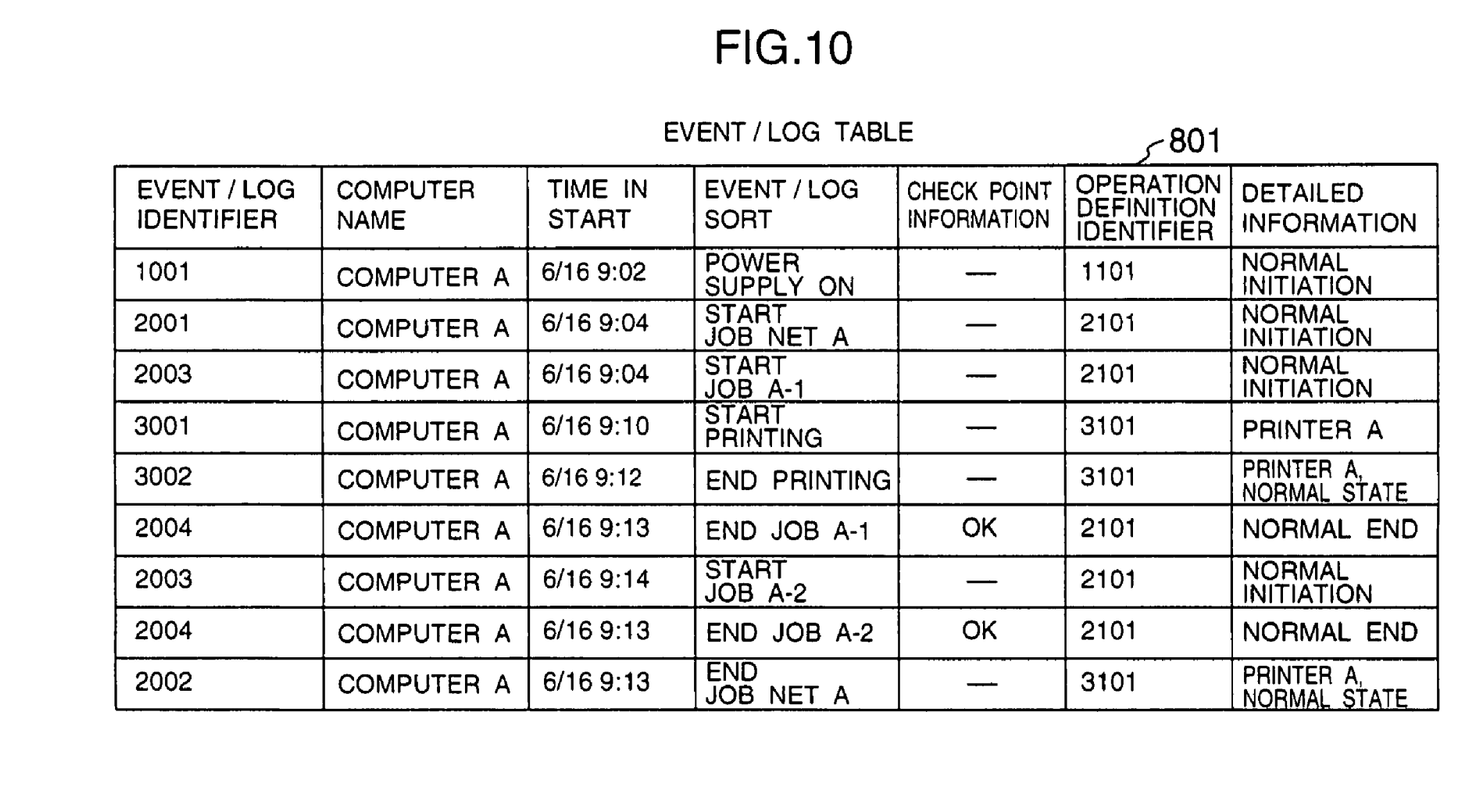
FIG. 10 schematically indicates a structure of an event log table.

In addition, the judgement of the abovementioned point which can be retried may be carried out as follows: That is, an application program itself outputs a specific end code at such a time instant when a specific process operation among a series of process operations is ended; the operation definition/event information acquiring unit 113 of the integrated management agent 110 notifies the event information added with the end code to the managing computer; the event action control unit 104 of the managing computer 201 refers to the above-mentioned event information stored in the database 105, so that the managing computer 201 can judge the retryable point based upon the above-mentioned event information. The specific end code outputted by the application program itself corresponds to "check point information" of an event log table shown in FIG. 10. When. "check point information" indicates "OK", the end time instant of this job corresponds to the retryable check point, which indicates that a job subsequent to this job can be executed. It should be understood that as to the actual retry check point, the job may be retried from the immediately the latest "OK" by referring to the event/log information with respect to this job net.

Next, when the operation process can be automatically retried, a selection is made of such a computer which is operated under normal condition from the computer management information (504). An operation condition of a computer may be judged by referring to the computer management table 701 on the database of FIG. 7. With respect to the selected computer, an execution of a process operation is instructed from the retryable point (505). At this time, a program for executing an operation process is transferred to the above-mentioned computer, if required. Upon receipt of the above-mentioned instruction, the computer starts to execute the designated operation process (506).

Figure 6:
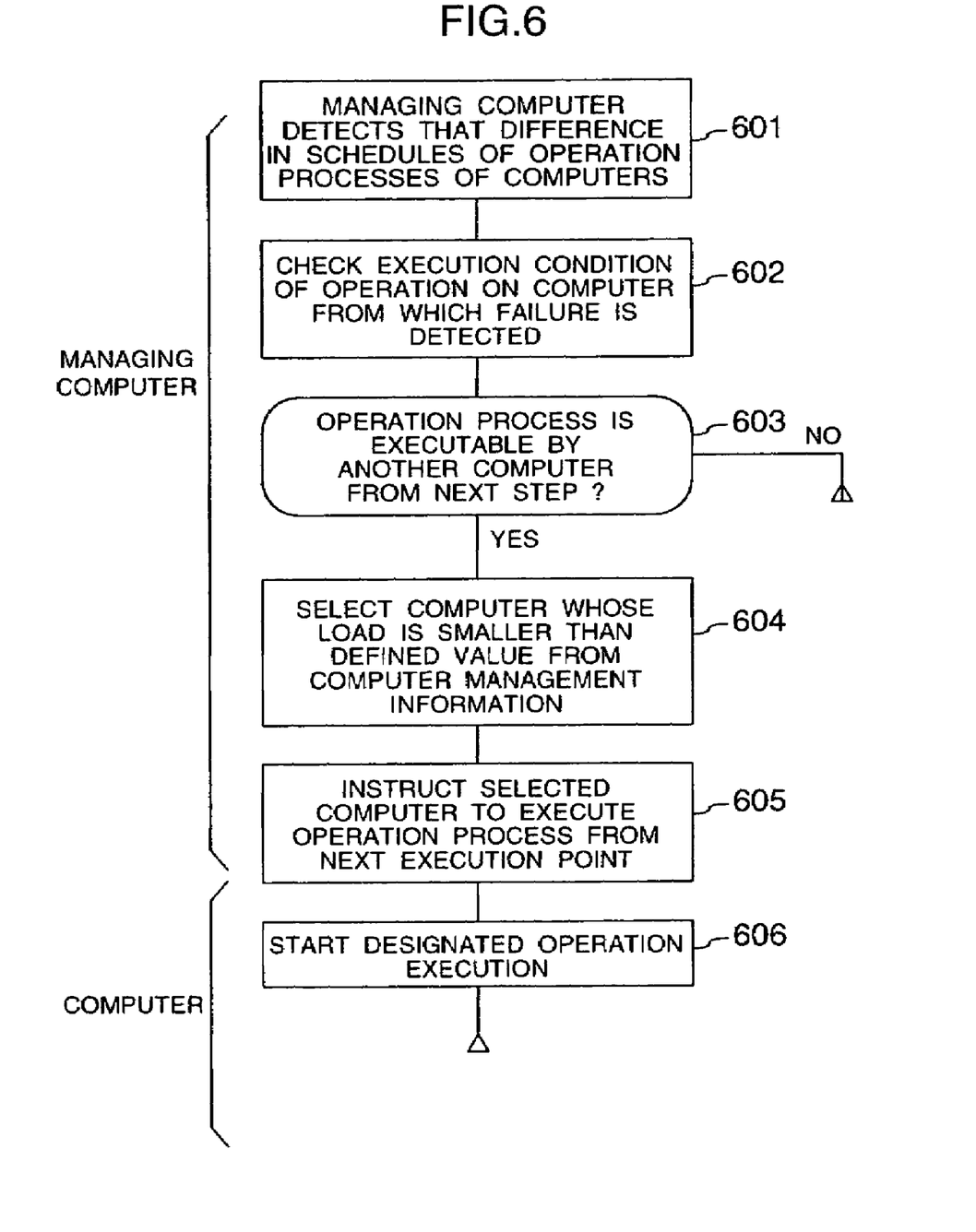
FIG. 6 is an explanatory diagram for showing a recovery sequence when a failure of a load is detected by the computer.

Next, a procedure when a termination time of an operation process becomes excessive will now be explained with reference to FIG. 6.

When the managing computer detects that a termination time of an operation process of a computer is increased larger than a definition value (601), this managing computer checks an execution condition of an operation on the computer from which the abnormal condition is detected (602). The judgement of delay is performed by calculating a difference between an initiation scheduled time instant and time instant information based on this initiation scheduled time instant described in the operation definition tables 702 to 704, and also the time instant information recorded on the event information such as the operation start/end notified from the computer to be managed. As one example for checking the operation execution condition on the computer from which the abnormal condition is detected, a judgement is made as to whether or not an ending point of the operation under execution may constitute such a point that the computer is switched. As a result, the computer may judge as to whether or not the time instant when this operation is ended corresponds to the retryable point, or as to whether or not such a judgement cannot be made at a starting time instant of each of the operations process. Then, this computer outputs this information to be added to an operation start event, and notifies the resultant information to the managing computer.

In the managing computer, a judgement is made of a retry possibility based upon the information notified from the computer to be managed (603). When the managing computer judges that the ending time instant of the present operation corresponds to the switching point, and when the operation under execution is terminated, the managing computer selects such a computer whose load value is not abnormal from the computer management table 701(604), and then instructs the selected computer to execute the operation process (605). At this time, a program used to execute an operation process is transferred to the above-mentioned computer, if necessary. Upon receipt of the abovementioned instruction, the computer to be managed starts to execute the designated operation process (606).

The effects and advantages achieved by the operation managing system according to the embodiment will now be described as follows:

As a first effect, the problems occurred in the operation can be readily solved. In accordance with the present invention, while the definitions, the execution conditions, and the execution results related to the operations are managed integrally mode, since the information about these definitions, execution conditions, and execution results are managed in connection with the arrangement and the conditions of the computer system, for example, when a failure happens to occur in a specific computer, such an operation influenced by this failure can be readily grasped. For instance, when a failure happens to occur in a specific computer, a display color of a symbol of this fail computer on a computer monitor screen is changed, and furthermore, a display color of an operation symbol under execution by a computer, displayed on the operation monitor screen, is changed; As a consequence, the problems occurred on the operation can be easily solved. In addition, while the execution conditions of the operation and the conditions/loads of the computer are managed in combination with the above aspects, when either the failure or the performance problem occurs, the operation processes can be automatically allocated in the dynamic manner to the computers operated under normal conditions.

As a second effect, a network traffic can be reduced. In accordance with the present invention, since the operation definition information, the event information, and the log information are stored in the database form by the managing computer 201, the managing computer 201 need not acquire the necessary information from the computer to be managed every time the operation manager and the like refer to these information, especially, such information whose change frequency is low.

For instance, in the network structure of FIG. 2, when a log message of 1 K bytes per one message is acquired from each of the computers to be managed by the managing computer at a frequency of 1,000 messages/day, a network traffic of 6 M bytes/day is produced. When these log messages are directly acquired from the computers to be managed at a frequency of 10 times/day to be referred, a network traffic of 60 M bytes/day in total is produced. Also, as to detailed contents of execution results about such a log with a low demand of a real-time characteristic, if these detailed contents are scheduled so as to be collected within such a time range where the normal network traffic is low, for example, in a night time range, the network traffic reduction effect in a day time can be apparently achieved.

While the present invention has been described, in the computer system to which a plurality of computers are connected, the managing computer for managing these computers may manage the operations executed in the respective computers collectively, and further may perform the operations in a mutual relationship with the managements of the own computers. As a consequence, the problems can be readily solved without loading the managing computer.

What is claimed is:

1. A computer operation managing system which includes a managing computer and a plurality of computers to be managed, wherein each of said plurality of computers to be managed comprises:

a unit which receives operation defining information from said managing computer, a unit which causes execution of an operation processing including at least one of job execution control, power supply control and printing execution control in accordance with the operation defining information from said receiving unit, a unit which transmits a result of the execution by said execution causing unit to said managing computer, and a unit, responsive to an instruction from said managing computer, for collecting management information including load information of said computer to be managed and returning the collected information to said managing computer;

wherein said managing computer comprises:

a management information control portion including a unit which collects the managing information and the execution result transmitted from the managed computer, a unit, coupled to said collecting unit of the managing computer, for managing operation of the managed computers using the operation defining information transmitted to the managed computers, the collected management information and the execution result, and an integrated managing screen display unit displaying a state of management by the managing computer on a screen, wherein said integrated managing screen display unit represents a connection relationship among the managed computers by links among symbols, represents an operation state of a relevant managed computer in the form of a symbol color, represents an execution on the computers in the form of a symbol, represents each of operations executed order of operations by links with directions among symbols, represents an execution state of each operation in the form of a symbol color, represents a connection relationship among the managed computers by links among symbols, and represents an operation state of the relevant computer in the form of a symbol color.

2. A computer operation managing system which includes a managing computer and a plurality of computers to be managed, wherein each of said plurality of computers to be managed comprises:

a unit which receives operation defining information from said managing computer, a unit which causes execution of an operation processing including at least one of job execution control, power supply control and printing execution control in accordance with the operation defining information from said receiving unit, a unit which transmits a result of the execution by said execution causing unit to said managing computer, and a unit, responsive to an instruction from said managing computer, for collecting management information including load information of said computer to be managed and returning the collected information to said managing computer;

wherein said managing computer comprises:

a management information control portion including a unit which collects the managing information and the execution result transmitted from the managed computer, a unit, coupled to said unit of said management information control portion of the managing computer, for managing operation of the managed computers using the operation defining information transmitted to the managed computers, the collected management information and the execution result, and an integrated managing screen display unit displaying a state of management by the managing computer on a screen by displaying computer symbols each indicating one of the managed computers and a connection relationship among the managed computers by links among the symbols, wherein said integrated managing screen display unit changes the screen to display details of an operation execution state on a relevant managed computer including any of a list of defined jobs, a list of jobs under execution and information of past execution history responsive to designation of a specified managed computer on a display screen, displays a configuration of a set of computers, designates a specified message on a relevant screen from a monitoring screen displaying, by a message, an operation state of an execution result of an operation system or a computer system to display on another screen of the same console, displays a configuration screen of a set of computers including managed computers related with said message or displays an operation configuration screen related with said message, and displays process symbols each of which indicates an extracted operating process and link with directions among said process symbols, indicates retrieved execution order of operating process and color of each process symbol and indicates execution condition based on execution condition information.

3. A computer operation managing system which includes a managing computer and a plurality of computers to be managed, wherein each of said plurality of computers to be managed comprises:

a unit which receives operation defining information from said managing computer, a unit which causes execution of an operation processing including at least one job execution control, power supply control and printing execution control in accordance with the operation defining information from said receiving unit, a unit which transmits result of the execution by said execution causing unit to said managing computer, and a unit, responsive to an instruction from said managing computer, for collecting management information including load information of said computer to be managed and returning the collected information to said managing computer;

wherein said managing computer comprises:

a management information control portion including a unit which collects the managing information and the execution result transmitted from the managed computer, a unit, coupled to said collecting unit of said management information control portion of the managing computer, for managing operation of the managed computers using the operation defining information transmitted to the managed computers, the collected management information and the execution result, and an integrated managing screen display unit displaying a state of management by the managing computer on a screen by displaying computer symbols each indicating one of the managed computers and a connection relationship among the managed computers by links among the symbols, wherein said integrated managing screen display unit relates to a particular computer with an operation executed on the computers switching a monitoring screen displayed by an operation monitoring unit and a monitoring screen displayed by a computer monitoring unit alternately for display to manifest the relation between the operation and the computer, and displays process symbols each of which indicates an extracted operating process and link with directions among said process symbols, indicates retrieved execution order of operating process and color of each process symbol and indicates execution condition based on execution condition information.

4. A computer operation management system which includes a managing computer and a plurality of computers to be managed, wherein each of said plurality of computers to be managed comprises:

a receiving unit that receives, from said managing computer via a network, operation defining information including definition of a series of operation processes and order of the operations processes, and specification of at least one of a managed computer to execute at least one of said series of operation processes, a processor unit that executes at least one of operation processes to be executed in accordance with said specification in the operation defining information received by said receiving unit, and a transmit unit that transmits execution condition information of operation process to be executed by managed computer, wherein said managing computer comprises:

a collecting unit that receives said execution condition information of operation process from the managed computer, a memory unit that stores said operation defining information and execution condition information of operation process correlated to each operation process in an operation defining information, a control unit of said managing computer that correlates said execution condition information of operation process to either one of said operation defining information which includes the operating process which corresponds to said execution condition information to store said execution condition information in said memory unit, and outputs to an integrated managing screen display if execution condition information is received by collecting unit, and an integrated managing screen display unit that displays a plurality of computer symbols each of which indicates a managed computer and a connection relationship among the managed computers by links among said symbols, wherein said control unit, if at least one of said computer symbols is selected, retrieves operation defining information in said memory unit, extracts, from operation defining information, a plurality of operation processes to be executed by at least one of computers indicated by said selected symbol, execution order among said extracted operation processes, retrieves, in said memory unit, execution condition information correlated to each of said extracted operation processes, and outputs to said integrated managing screen display unit the extracted operation processes, and wherein said integrated managing screen display unit displays process symbols each of which indicates each extracted operation process and link with directions among said process symbols indicating the execution order of the retrieved operation process, and color of each process symbol which indicates an execution condition based on the execution condition information.

5. A computer operation management system according to claim 4, wherein said control unit generates said operation defining information which is identified by an operation defining identification and stores said operation defining information with said operation defining identification, wherein said collecting unit receives said execution condition information including said operation defining identification, and wherein said control unit correlates execution condition information and operation defining information if there are the same operation defining identifications between said execution condition information and said operation defining information.

6. A computer operation management system according to claim 5, wherein at least one of said operation processes is related to either power supply control or printing execution control.

7. A computer operation management system according to claim 5, wherein a series of operation processes are defined that both a first operation process and a second operation process may execute after a third operation process has finished to executing.

8. A computer operation management system according to claim 5, wherein a series of operation processes are defined that a first operation process may execute after both a second operation process and a third operation process have finished to executing.

9. A computer operation management system which includes a managing computer and a plurality of computers to be managed, wherein each of said computers to be managed comprises:

a receiving unit that receives, from said managing computer via a network, operation defining information including definition of a series of operation processes and order of operation processes, and specification of at least one of a managed computer to execute at least one of said series of operation processes, a processor unit that executes at least one of said operation processes to be executed in accordance with said specification in the operation defining information received by said receiving unit, and a transmit unit that transmits execution condition information of an operation process to be executed by managed computer, and wherein said managing computer comprises:

a collecting unit that receives said execution condition information of said operation process from the managed computer, a memory unit that stores said operation defining information and execution condition information of an operation process corrected to each operation process in an operation defining information, and a control unit of said managing computer that correlates said execution condition information of operation process to either one of said operation defining information which includes the operation process which corresponds to said execution condition information to store said execution condition information in said memory unit, and outputs to an integrated managing screen display, said operation definition information and said execution condition information and correlation between said operation definition information and said execution condition information;

said integrated managing screen display displays, based on outputted operation definition, both process symbols each of which indicates each operating process and link with directions among said process symbols, indicates said specified execution order of said operation processes, and displays based on the outputted execution condition information, a color of each of said process symbol indicating an execution condition, wherein said control unit receives a request of displaying computers which are specified operation processes including said displayed operation definition information from said integrated managing screen display, retrieves operation defining information in said memory unit, extracts said managed computers each of which are specified to execute operation defining information, and outputs to said integrated managing screen display unit, extracted computers, and wherein said integrated managing screen display displays each computer symbol which indicates the managed computer and a connection relationship among the managed computers by links among said computer symbols.

10. A computer operation management system according to claim 9, wherein said control unit generates said operation defining information which is identified by an operation defining identification and stores said operation defining information with said operation defining identification, wherein said collecting unit receives said execution condition information including said operation defining identification, and wherein said control unit correlates execution condition information and operation defining information if there are the same operation defining identifications between said execution condition information and said operation defining information.

11. A computer operation management system according to claim 10, wherein at least one of said operation processes is related to either power supply control or printing execution control.

12. A computer operation management system according to claim 10, wherein a series of operation processes are defined that both a first operation process and a second operation process may execute after a third operation process has finished executing.

13. A computer operation management system according to claim 10, wherein a series of operation processes are defined that a first operation process may execute after both a second operation process and a third operation process have finished executing.

* * * * *

UNITED STATES PATENT AND TRADEMARK OFFICE
CERTIFICATE OF CORRECTION

PATENT NO. : 7,155,498 B1
APPLICATION NO. : 09/721616
DATED : December 26, 2006
INVENTOR(S) : T. Hirata et al.

It is certified that error appears in the above-identified patent and that said Letters Patent is hereby corrected as shown below:

Title Page, insert
--     (30)     Foreign Application Priority Data Nov. 7, 1997    (JP).................9-306067 --

Signed and Sealed this

Twenty-seventh Day of March, 2007

JON W. DUDAS
*Director of the United States Patent and Trademark Office*